(12) United States Patent
Greenfield et al.

(10) Patent No.: US 10,241,916 B2
(45) Date of Patent: Mar. 26, 2019

(54) SPARSE SUPERLINE REMOVAL (71) Applicant: INTEL CORPORATION, Santa Clara, CA (US)

(72) Inventors: Zvika Greenfield, Kfar Sava (IL); Zeshan A. Chishti, Hillsboro, OR (US); Israel Diamand, Aderet (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/476,798

(22) Filed: Mar. 31, 2017

(65) Prior Publication Data

US 2018/0285271 A1 Oct. 4, 2018

(51) Int. Cl.
*G06F 12/08* (2016.01)
*G06F 12/0831* (2016.01)
*G06F 12/128* (2016.01)
*G06F 12/0891* (2016.01)
*G06F 12/0868* (2016.01)
*G06F 12/0804* (2016.01)
*G06F 12/0893* (2016.01)
*G06F 12/0895* (2016.01)
*G06F 12/123* (2016.01)
*G06F 12/121* (2016.01)

(52) U.S. Cl.
CPC ...... *G06F 12/0831* (2013.01); *G06F 12/0804* (2013.01); *G06F 12/0868* (2013.01); *G06F 12/0891* (2013.01); *G06F 12/0893* (2013.01); *G06F 12/0895* (2013.01); *G06F 12/123* (2013.01); *G06F 12/128* (2013.01); *G06F 12/121* (2013.01); *G06F 2212/608* (2013.01); *G06F 2212/69* (2013.01)

(58) Field of Classification Search
CPC ............. G06F 12/0804; G06F 12/0815; G06F 12/0891; G06F 12/0833
USPC ........................................................ 711/133
See application file for complete search history.

(56) References Cited

U.S. PATENT DOCUMENTS

| | | | |
|---|---|---|---|
| 8,612,676 B2 | 12/2013 | Dahlen et al. | |
| 2014/0047183 A1* | 2/2014 | Chawla | G06F 12/084 711/119 |
| 2015/0261615 A1* | 9/2015 | Peterson | G06F 11/1446 714/6.23 |
| 2016/0350237 A1* | 12/2016 | Anantaraman | G06F 12/121 |
| 2017/0091099 A1* | 3/2017 | Greenfield | G06F 12/0811 |

FOREIGN PATENT DOCUMENTS

WO 2016/191016 12/2016

* cited by examiner

*Primary Examiner* — Than Nguyen
(74) *Attorney, Agent, or Firm* — Konrad Raynes Davda & Victor LLP; Janaki K. Davda (57) ABSTRACT

Provided are an apparatus, system, and method for sparse superline removal. In response to occupancy of a replacement tracker (RT) exceeding an RT eviction watermark, an eviction process is triggered for evicting a superline from a sectored cache storing at least one superline. An eviction candidate is selected from superlines that have: 1) a sector usage below or equal to a superline low watermark and 2) an RT timestamp that is greater than a superline age watermark.

21 Claims, 10 Drawing Sheets

SPARSE SUPERLINE REMOVAL

TECHNICAL FIELD

Embodiments described herein generally relate to an apparatus, system, and method for sparse superline removal.

BACKGROUND

Some cache memories may be structured as "sectored" cache, in which multiple cache lines for example, 64 cache lines are grouped to form a "superline" which is identified by a single tag such that all the cache lines within that superline are identified by the single tag. In a sector write-back cache, a complete superline must be evicted if it is chosen as a replacement (i.e., victim) candidate.

A sectored cache assumes spatial and temporal locality (i.e. accessing one sector (cache line) within a superline means that most of the superline is used). However, studies show that there are exceptions to this rule, and the exceptions tend to be extreme. For example, if a superline is not fully used, there is a high probability that only a small portion of it is used for a relatively short period of time. These sparsely used superlines may occupy valuable cache space without much benefit.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Embodiments evict sparsely used superlines from sectored cache based on the number of cache lines (sectors) within the superline that have been used and how long ("age of the superline") the superline has been in the sectored cache.

Figure 1:
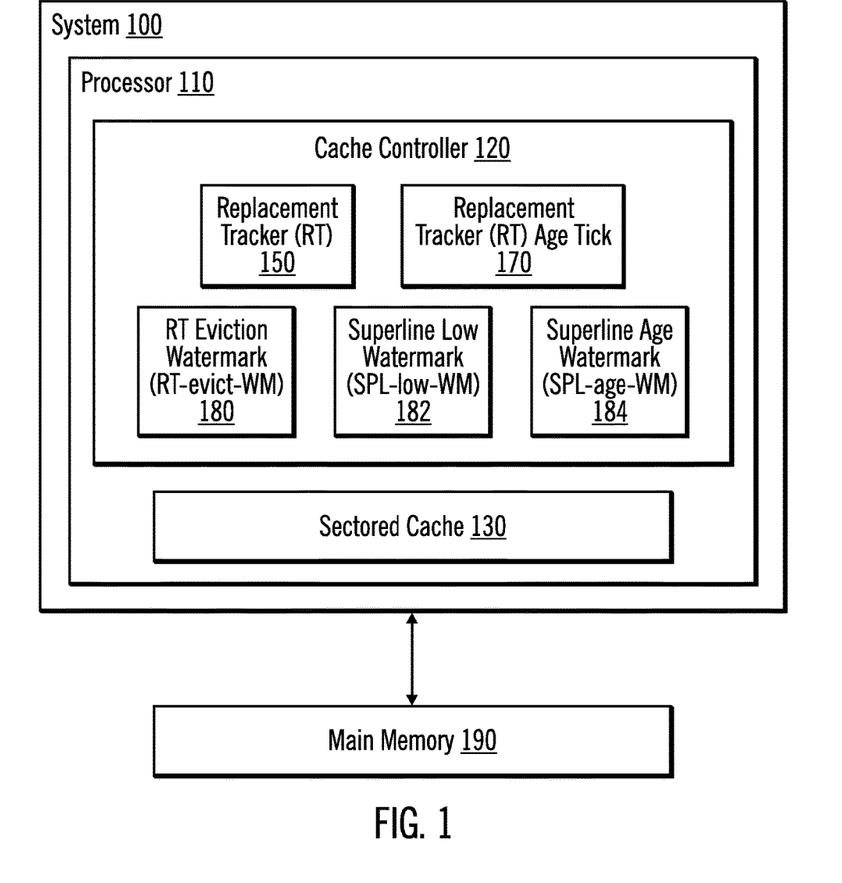
FIG. 1 illustrates, in a block diagram, a computing environment in accordance with certain embodiments.

FIG. 1 illustrates, in a block diagram, a computing environment in accordance with certain embodiments. In FIG. 1, a system 100 includes a processor 110 (e.g., a central processing unit). The processor 110 may comprise one or more processors in various embodiments. Embodiments are applicable to any system 100 with a sectored cache (e.g., a system on chip (SoC) or a system with separate processor and memory chips). The processor 110 includes a cache controller 120 and a sectored cache 130. The cache controller 120 includes a replacement tracker (RT) 150 for the sectored cache 130, an RT age tick 170 (a global timer), an RT eviction watermark 180 for the replacement tracker 150, a superline low watermark 182 for each superline, and a superline age watermark 184 for each superline. In certain embodiments, an RT age tick 170, an RT eviction watermark 180, a superline low watermark 182, and a superline age watermark 184 may be registers. The system 100 is coupled to main memory 190.

With embodiments, the sectored cache 130 is volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 2:
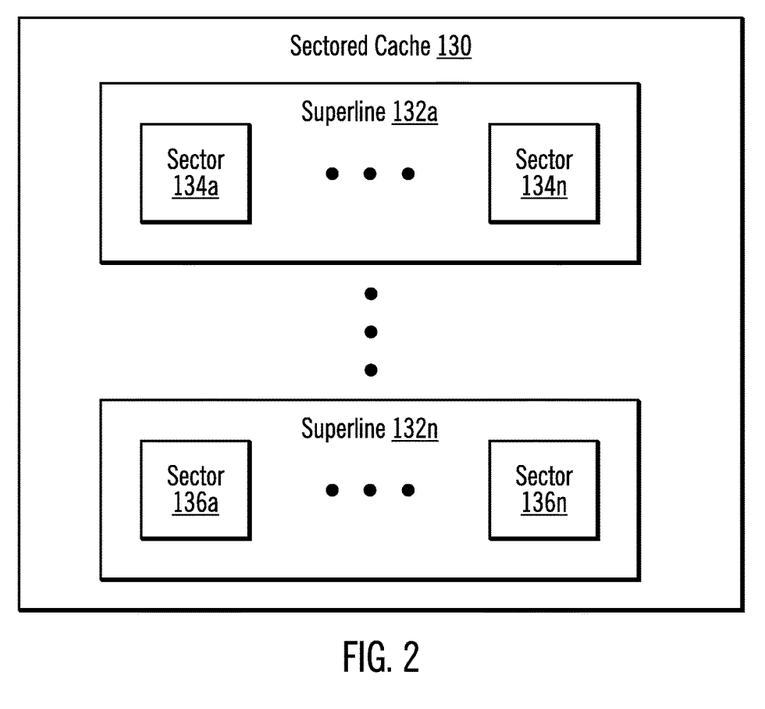
FIG. 2 illustrates, in a block diagram, further details of a sectored cache in accordance with certain embodiments.

FIG. 2 illustrates, in a block diagram, further details of the sectored cache 130 in accordance with certain embodiments. The sectored cache 130 stores superlines 132a . . . 132n. In particular, the sectored cache 130 stores a superline (chunks of data) having a set of sectors (cache lines). For example, data for superline 132a includes sectors 134a . . . 134n, while data for superline 132n includes sectors 136a . . . 136n.

The sectored cache 130 is divided into "sets" and "ways". With embodiments, the sectored cache 130 is a subset of main memory 190, and a mechanism is provided to map main memory addresses to locations within the sectored cache 130. The "set" number establishes this mapping. "Set" number is derived from a subset of address bits and identifies the location in the sectored cache 130 where an incoming data item is mapped. "Ways" provide additional flexibility. If multiple main memory addresses map to the same set in sectored cache 130, then they can concurrently reside in different ways within the same set in sectored cache 130. For example, the sectored cache may comprise two or more ways (e.g., WAY0, WAY1, up to WAY N). Each superline in each way may comprise multiple cache lines (e.g., CL0, CL1, CL2, CL3). Each superline is identified by a single tag.

With embodiments, filling a superline refers to the data corresponding to the superline being written into the sectored cache. The "fill" operation may be triggered by a read or write access from the processor that results in a cache miss. In response to the cache miss, the data is read from the main memory 190 and then sent to both the sectored cache 130 and the processor that requested the data.

With embodiments, while a superline is being filled into the sectored cache (i.e., written to by the processor), the RT tracker 150 monitors which sectors of the superline have been filled and updates an RT entry to indicate which sectors have been filled (by updating sector valid indicators). Thus, sector usage may be determined based on how many of the sector valid indicators have been set to indicate that the corresponding sector has been filled (e.g., if 50 out of 100 sector valid indicators indicate that corresponding sectors have been filled, then the sector usage is 50%). The RT entry also includes an RT timestamp that indicates an age of the superline. The RT timestamp for the superline is initially set to zero and then incremented to indicate an age of the superline. Embodiments evict the superlines that are sparsely utilized and that are older based on the sector valid indicators (that indicate which sectors of a superline have been filled) and the RT timestamp (that indicates an age of the superline).

If the data in the superline in the cache is different from (i.e., newer than) the data in the superline in the main memory 190, then eviction may include copying newer data from the sectored cache 130 to the main memory 190; otherwise, eviction refers to discarding data from the sectored cache 130.

With embodiments, the cache controller uses a structure (e.g., in hardware) called a replacement tracker (RT) to keep track of the superlines that are in the process of being filled into the sectored cache. Each RT entry maintains information about the superline that is being transferred from main memory 190 to sectored cache 130, such as which cache set and way number does this superline map to, which sectors within the superline have (or have not) already been transferred to sectored cache, etc. Once the entire superline is transferred to sectored cache, the RT entry is released and may subsequently be used to track a different incoming superline.

In accordance with certain embodiments, the replacement tracker also keeps track of superlines that are being evicted from the sectored cache. In such embodiments, there may another set of RT entries that are tracking information about "outgoing" superlines (such as which sectors within an outgoing superline have already been written back to main memory 190).

Embodiments augment each RT entry to keep track of the sector usage and age information for incoming superlines from main memory 190 to sectored cache 130. For each RT entry, the cache controller sets these values.

Figure 3:
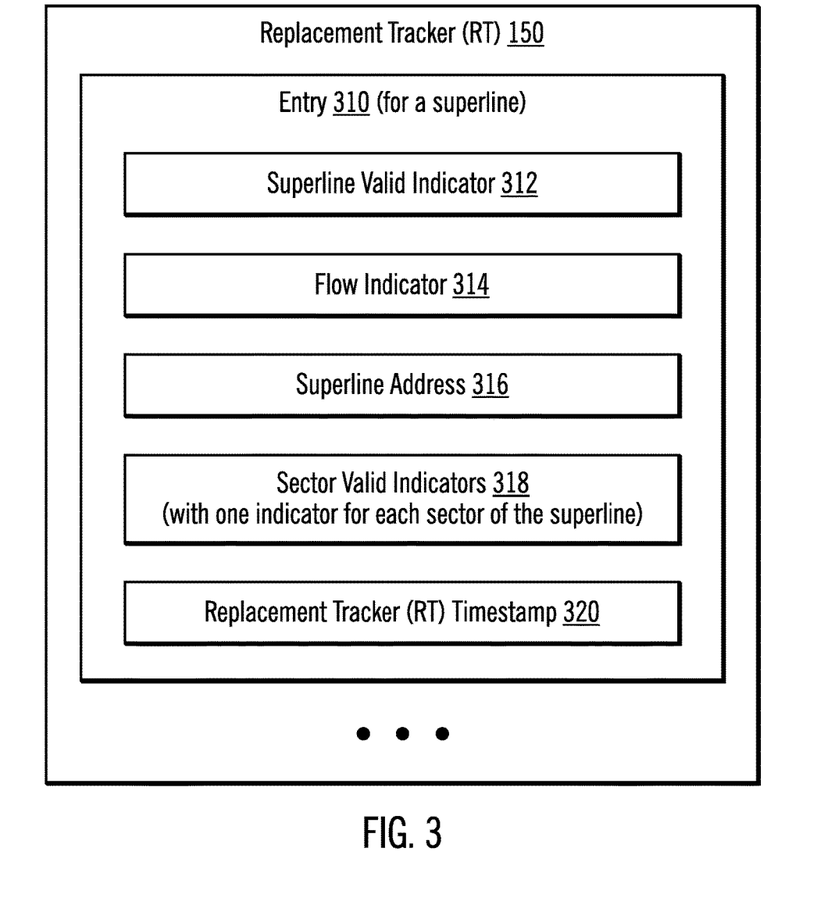
FIG. 3 illustrates, in a block diagram, further details of a replacement tracker (RT) in accordance with certain embodiments.

FIG. 3 illustrates, in a block diagram, further details of the replacement tracker (RT) 150 in accordance with certain embodiments. The RT 150 includes entry 310. Entry 310 includes a superline valid indicator 312, a flow indicator 314, a superline address 316, sector valid indicators 318, and an RT timestamp 320.

The superline valid indicator 312 indicates whether this RT entry is being used for a superline. With embodiments, the superline valid indicator 312 may be a bit that is set with a first value (e.g., 0) to indicate that the RT entry is not being used for a superline and set with a second value (e.g., 1) to indicate that the RT is begin used for a superline.

The flow indicator 314 indicates whether the state is a fill state or an evict state. The fill state indicates that the superline is being filled with data, while the evict state indicates that the data of the superline is being evicted (which is used for RT entries that are tracking outgoing (evicted) superlines). With embodiments, the flow indicator 314 may be a bit that is set with a first value (e.g., 0) to indicate that the superline is being evicted and set with a second value (e.g., 1) to indicate that the superline is being filled.

The superline address 316 is an address of a transaction that initiated the fill. There is one sector valid indicator for each sector, and the sector valid indicator indicates whether that sector has been filled or not. With embodiments, the sector valid indicator may be a bit that is set with a first value (e.g., 0) to indicate that the sector does not have data and set with a second value (e.g., 1) to indicate that the sector does have data. The RT timestamp is used to set an age of the superline.

Figure 4A:
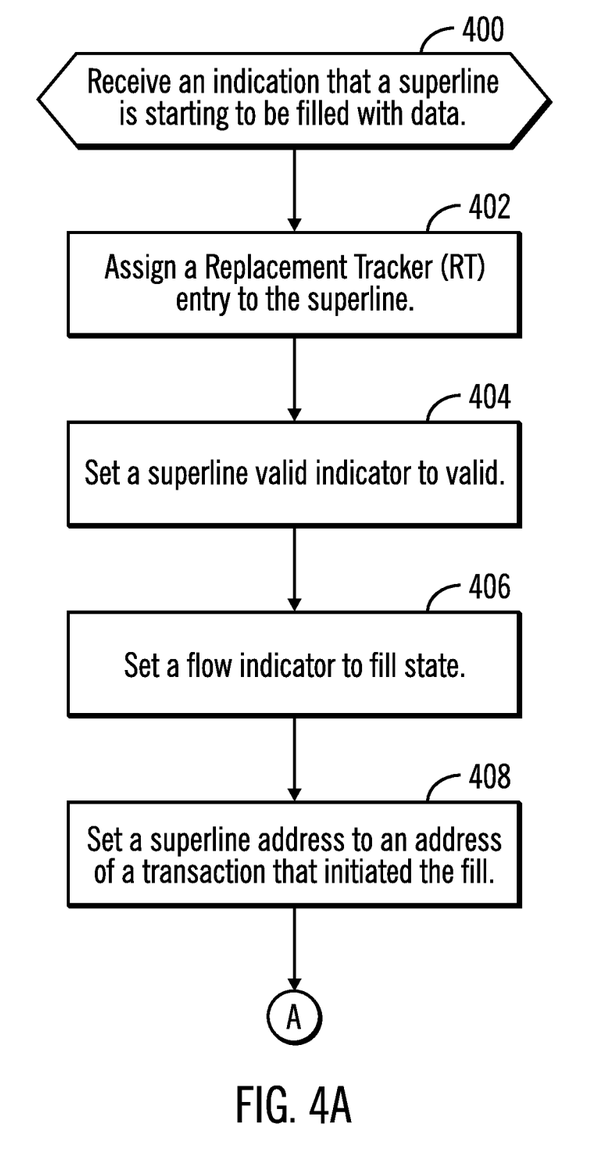
FIGS. 4A and 4B illustrate, in a flow diagram, operations for initialization in accordance with certain embodiments.
Figure 4B:
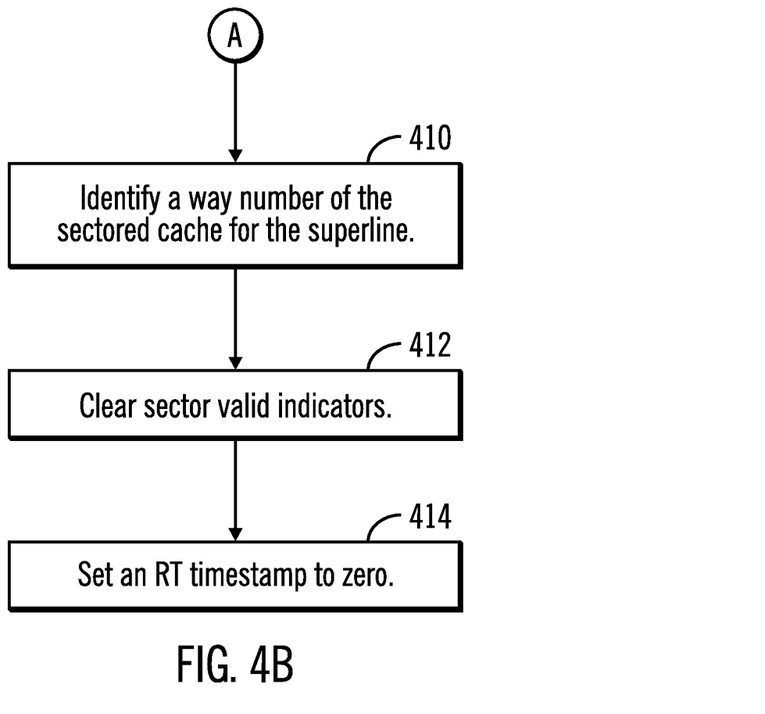

FIGS. 4A and 4B illustrate, in a flow diagram, operations for initialization in accordance with certain embodiments. Control begins at block 400 with the cache controller 120 receiving an indication that a superline is starting to be filled with data. In block 402, the cache controller 120 assigns a Replacement Tracker (RT) entry to the superline.

In block 404, the cache controller 120 sets a superline valid indicator to valid for the RT entry. This indicates that this RT entry is being used for a superline. In block 406, the cache controller 120 sets flow indicator to fill state to indicate that the superline is being filled with data. In block 408, the cache controller 120 sets a superline address to an address of a transaction that initiated the fill of the superline. From block 408 (FIG. 4A), processing continues to block 410 (FIG. 4B).

In block 410, the cache controller 120 identifies a way number of the sectored cache for the superline. With embodiments, the set number may be implicitly deduced from the address, while the way number may be determined by a replacement technique. In block 412, the cache controller 120 clears the sector valid indicators. Then, as data is stored in sectors, the valid indicators are updated to indicate that the sectors have data. In block 414, the cache controller 120 sets an RT timestamp to zero. The RT timestamp is used to track the age of the superline.

With embodiments, the RT age tick 170 is a global timer, which may be configured to tick once every N cycles. N may be configured to the range of 1000-100,000 clock cycles, which is the clock speed at which the cache controller 110 is operating.

Figure 5:
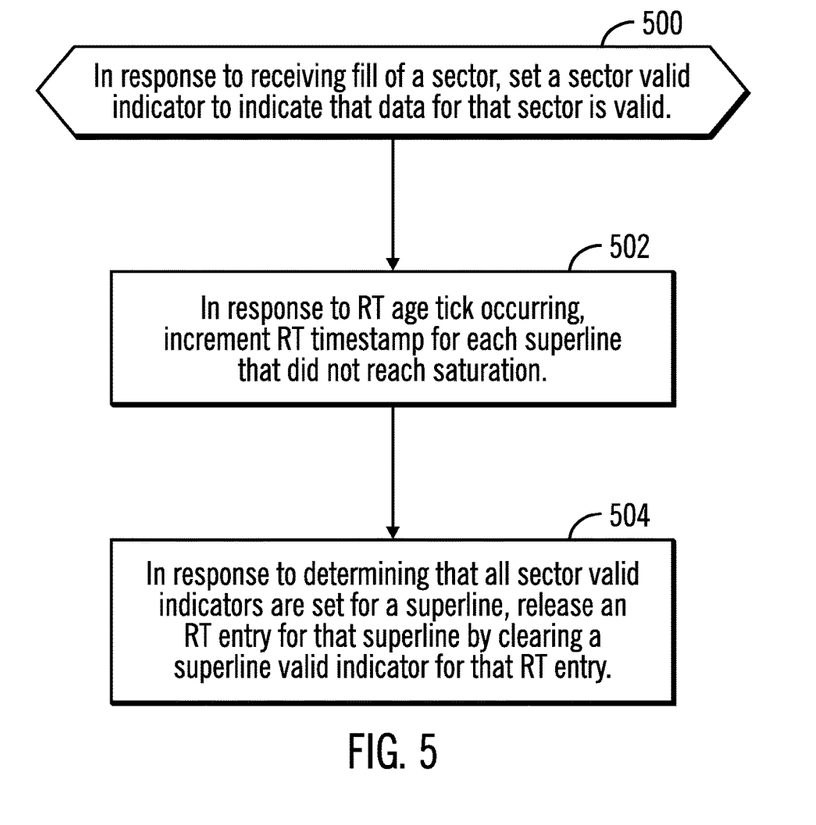
FIG. 5 illustrates, in a flow diagram, operations for updating an RT entry in accordance with certain embodiments.

FIG. 5 illustrates, in a flow diagram, operations for updating an RT entry in accordance with certain embodiments. Control begins at block 500 with, in response to receiving fill of a sector, the cache controller 120 setting a sector valid indicator to indicate that data for that sector is valid. In block 502, in response to RT age tick occurring, the cache controller 120 increments the RT timestamps for each superline that did not reach saturation (0b1111). With embodiments, once the timestamp has reached its maximum value (1111), the timestamp cannot be incremented any further. This means that the age of the superline is beyond the range of what the timestamp can keep track of. In block 504, in response to determining that all sector valid indicators are set for a superline, releasing an RT entry for that superline by clearing the superline valid indicator for that RT entry.

With embodiments, as long as the superline is tracked, the cache controller 120 has an indication of the age of the superline and the level to which the sectors within the superline have been used.

Embodiments rely on the replacement tracker's occupancy level to decide whether there is a need to initiate early eviction of sparsely used superlines. If the replacement tracker is mostly empty, then sparsely used superlines are not consuming much replacement tracker capacity and do not need to be evicted. However, once the replacement tracker starts becoming full, embodiments evict sparse superlines and use the freed up space for potentially more useful incoming superlines.

Embodiments use three thresholds:

RT eviction watermark 180 (RT-evict-WM) for the replacement tracker 150, which indicates replacement tracker occupancy for triggering early eviction.

superline low watermark 182 (SPL-low-WM) for each superline, which indicates sector usage within a superline for deciding early eviction eligibility.

superline age watermark 184 (SPL-age-WM) for each superline, which indicates a superline age for deciding early eviction eligibility.

Figure 6:
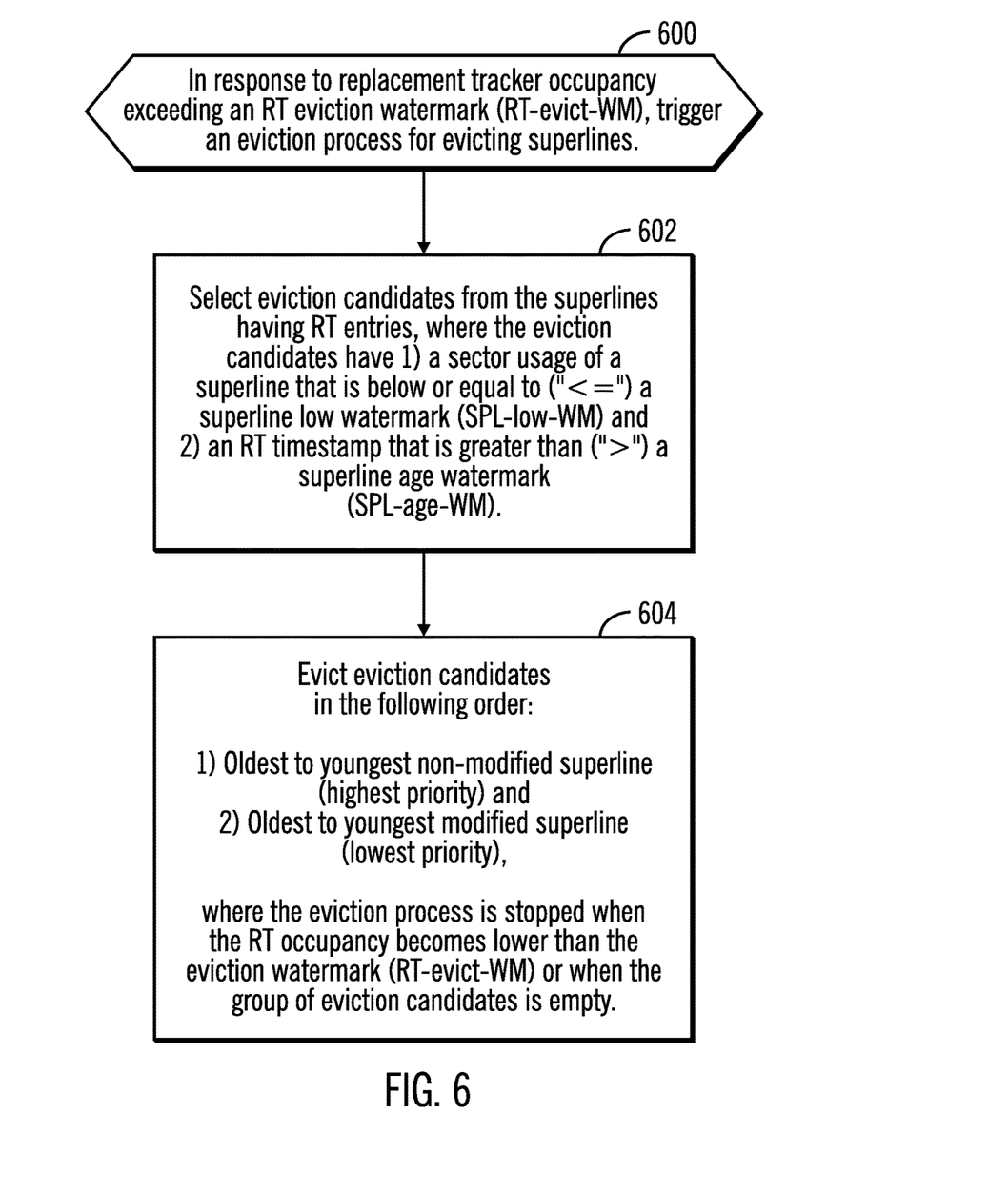
FIG. 6 illustrates, in a flow diagram, operations for evicting sparsely used superlines in accordance with certain embodiments.

FIG. 6 illustrates, in a flow diagram, operations for evicting sparsely used superlines in accordance with certain embodiments. Control begins at block 600 with, in response to replacement tracker occupancy exceeding an RT eviction watermark (RT-evict-WM), the cache controller 120, triggers an eviction process for evicting superlines. In block 602, the cache controller 120 selects eviction candidates from the superlines having RT entries, where the eviction candidates have 1) a sector usage of a superline that is below or equal to ("<=") a superline low watermark (SPL-low-WM) and 2) an RT timestamp that is greater than (">") a superline age watermark (SPL-age-WM). In block 604, the cache controller 120 evicts eviction superlines in the following order:

1) Oldest to youngest non-modified superline (highest priority); and
2) Oldest to youngest modified superline (lowest priority).

Embodiments provide better utilization of RT entries and cache capacity in the cache. This may reduce the amount of buffering needed in the cache controller and may mitigate performance outliers. This refers to worse-case scenarios (such as memory-intensive applications) where there is high demand for RT entries.

With embodiments, the eviction process is stopped when the replacement tracker occupancy becomes lower than the RT eviction watermark (RT-evict-WM) or when the group of eviction candidates is empty.

In current sectored cache implementations, there is no notion of eviction because of occupancy-level or exact age. There is only an least recently used (LRU) approximation, which may cause sparsely used superlines to stay in the cache much longer than they are really needed.

Figure 7:
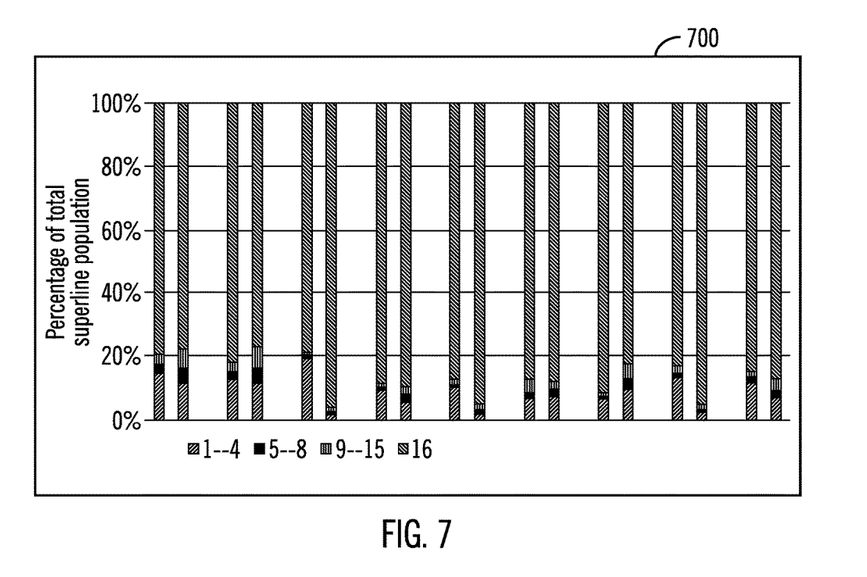
FIG. 7 illustrates, in a graph, percentage use of superlines in accordance with certain embodiments.
Figure 8:
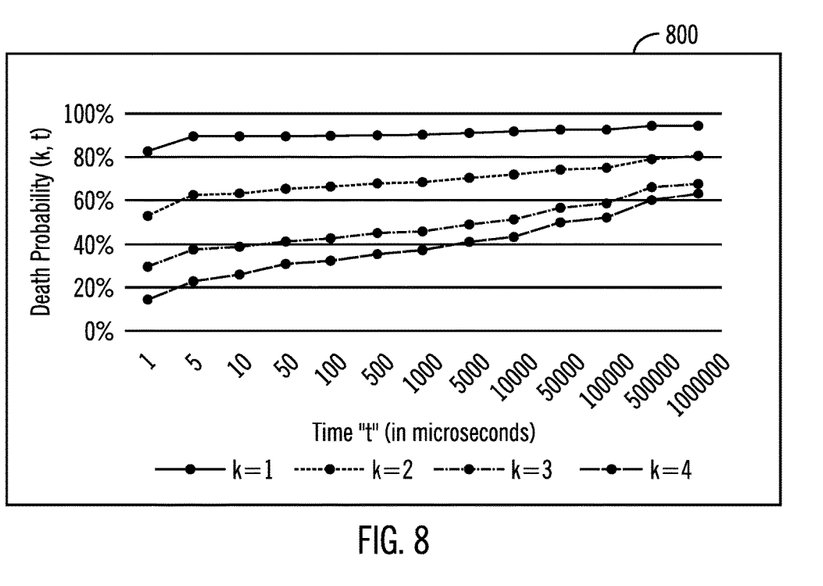
FIG. 8 illustrates, in a graph, that sparsely used superlines remain useful for relatively short periods of time in accordance with certain embodiments.

Studies show that the sparse superlines are not a negligible case, as FIGS. 7-8 illustrate (data is for a subset of memory-intensive client workloads).

FIG. 7 illustrates, in a graph, percentage use of superlines in accordance with certain embodiments. FIG. 7 shows that 85%-95% of the superlines are fully used (16 sectors), but ~10-15% of the superlines s are very sparsely used (1-4 sectors). The 5-15 sector range is 3%-5%.

FIG. 8 illustrates, in a graph, that sparsely used superlines remain useful for relatively short periods of time in accordance with certain embodiments. With embodiments, for 1-sector utilization, it may be a good idea to evict the superline after 10-20 milliseconds (msecs) and 2-sectors utilization after approximately 10 msecs.

The described operations of the processing components, such as component 120 of FIG. 1, may be implemented as a method, apparatus, device, computer product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a programmable gate array (PGA), field-programmable gate array (FPGA), application specific integrated circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

Figure 9:
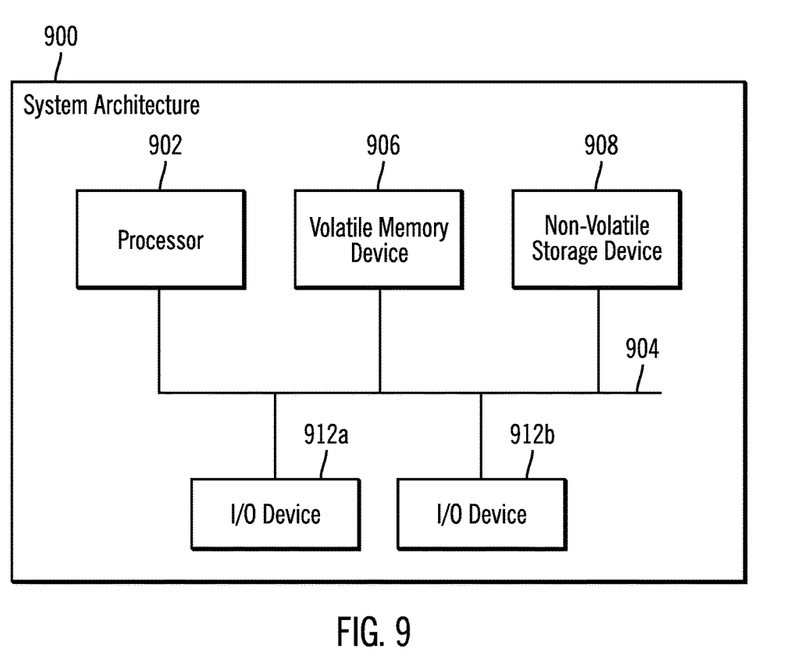
FIG. 9 illustrates an embodiment of a computer architecture in accordance with certain embodiments.

FIG. 9 illustrates an embodiment of a system architecture 900 in accordance with certain embodiments. System 100 may implement system architecture 900. The computer architecture 900 includes a processor 902 that communicates over a bus 904 with a volatile memory device 906 in which programs, operands and parameters being executed are cached, and a non-volatile storage device 908. The bus 904 may comprise multiple buses. Further, the bus 904 may comprise a multi-agent bus or not be a multi-agent bus, and instead provide point-to-point connections according to PCIe architecture. The processor 902 may also communicate with Input/output (I/O) devices 912*a*, 912*b*, which may comprise input devices, display devices, graphics cards, ports, network interfaces, etc.

In certain embodiments, the computer architecture 900 may comprise a personal computer, server, mobile device or embedded compute device. In a silicon-on-chip (SOC) implementation, the computer architecture 900 may be implemented in an integrated circuit die.

With embodiments, machine-readable storage includes machine-readable instructions, when executed, to implement a method or realize an apparatus as described herein.

The described data structures and information in FIGS. 1-9 are provided by way of example, and in further embodiments, certain of the described information fields may not be included and information in addition to that described may be provided.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following examples pertain to further embodiments.

Example 1 is an apparatus for sparse superline removal, comprising: a sectored cache to store at least one superline; a replacement tracker (RT); and a cache controller to: in response to occupancy of the replacement tracker exceeding an RT eviction watermark, trigger an eviction process for evicting a superline from the sectored cache; and select an eviction candidate from superlines that have: 1) a sector usage below or equal to a superline low watermark and 2) an RT timestamp that is greater than a superline age watermark.

In Example 2, the subject matter of examples 1 and 3-8 can optionally include that the cache controller is to evict the eviction candidate by evicting a non-modified superline before evicting a modified superline.

In Example 3, the subject matter of examples 1-2 and 4-8 can optionally include that the replacement tracker includes RT entries, and wherein each of the RT entries includes a superline valid indicator, a flow indicator, a superline address, sector valid indicators, and the RT timestamp.

In Example 4, the subject matter of examples 1-3 and 5-8 can optionally include that the cache controller is to: in response to receiving fill of a sector, set a sector valid indicator in the replacement tracker to indicate that data for that sector is valid.

In Example 5, the subject matter of examples 1-4 and 6-8 can optionally include that the cache controller is to: in response to an RT age tick occurring, increment the RT timestamp for each of the superlines that did not reach saturation.

In Example 6, the subject matter of examples 1-5 and 7-8 can optionally include that the cache controller is to: in response to determining that all sector valid indicators are set for a superline, release an RT entry for that superline by clearing a superline valid indicator for that RT entry.

In Example 7, the subject matter of examples 1-6 and 8 can optionally include that the cache controller is to: in response to receiving an indication that a particular superline of the superlines is starting to be filled with data, assign an RT entry to the superline.

In Example 8, the subject matter of examples 1-7 can optionally include that the cache controller is to: set a superline valid indicator to valid; set a flow indicator to fill state; set a superline address to an address of a transaction that initiated a fill; identify a way number of the sectored cache for the superline; clear sector valid indicators; and set an RT timestamp to zero.

Example 9 is a system for sparse superline removal, comprising: a processor; and a computer readable storage media including computer program code executed by the processor to perform operations comprising: in response to occupancy of a replacement tracker (RT) exceeding an RT eviction watermark, triggering an eviction process for evicting a superline from a sectored cache storing at least one superline; and selecting an eviction candidate from superlines that have: 1) a sector usage below or equal to a superline low watermark and 2) an RT timestamp that is greater than a superline age watermark.

In Example 10, the subject matter of examples 9 and 11-16 can optionally include evicting the eviction candidate by evicting a non-modified superline before evicting a modified superline.

In Example 11, the subject matter of examples 9-10 and 12-16 can optionally include that the replacement tracker includes RT entries, and wherein each of the RT entries includes a superline valid indicator, a flow indicator, a superline address, sector valid indicators, and the RT timestamp.

In Example 12, the subject matter of examples 9-11 and 13-16 can optionally include, in response to receiving fill of a sector, setting a sector valid indicator in the replacement tracker to indicate that data for that sector is valid.

In Example 13, the subject matter of examples 9-12 and 14-16 can optionally include, in response to an RT age tick occurring, incrementing the RT timestamp for each of the superlines that did not reach saturation.

In Example 14, the subject matter of examples 9-13 and 15-16 can optionally include, in response to determining that all sector valid indicators are set for a superline, releasing an RT entry for that superline by clearing a superline valid indicator for that RT entry.

In Example 15, the subject matter of examples 9-14 and 16 can optionally include, in response to receiving an indication that a particular superline of the superlines is starting to be filled with data, assigning an RT entry to the superline.

In Example 16, the subject matter of examples 9-15 can optionally include setting a superline valid indicator to valid; setting a flow indicator to fill state; setting a superline address to an address of a transaction that initiated a fill; identifying a way number of the sectored cache for the superline; clearing sector valid indicators; and setting an RT timestamp to zero.

Example 17 is a method for sparse superline removal, comprising: in response to occupancy of a replacement tracker (RT) exceeding an RT eviction watermark, triggering an eviction process for evicting a superline from a sectored cache storing at least one superline; and selecting an eviction candidate from superlines that have: 1) a sector usage below or equal to a superline low watermark and 2) an RT timestamp that is greater than a superline age watermark.

In Example 18, the subject matter of examples 17 and 19-24 can optionally include evicting the eviction candidate by evicting a non-modified superline before evicting a modified superline.

In Example 19, the subject matter of examples 17-18 and 20-24 can optionally include that the replacement tracker includes RT entries, and wherein each of the RT entries includes a superline valid indicator, a flow indicator, a superline address, sector valid indicators, and the RT timestamp.

In Example 20, the subject matter of examples 17-19 and 21-24 can optionally include, in response to receiving fill of a sector, setting a sector valid indicator in the replacement tracker to indicate that data for that sector is valid.

In Example 21, the subject matter of examples 17-20 and 22-24 can optionally include, in response to an RT age tick occurring, incrementing the RT timestamp for each of the superlines that did not reach saturation.

In Example 22, the subject matter of examples 17-21 and 23-24 can optionally include, in response to determining that all sector valid indicators are set for a superline, releasing an RT entry for that superline by clearing a superline valid indicator for that RT entry.

In Example 23, the subject matter of examples 17-22 and 24 can optionally include, in response to receiving an indication that a particular superline of the superlines is starting to be filled with data, assigning an RT entry to the superline.

In Example 24, the subject matter of examples 17-23 can optionally include: setting a superline valid indicator to valid; setting a flow indicator to fill state; setting a superline address to an address of a transaction that initiated a fill; identifying a way number of the sectored cache for the superline; clearing sector valid indicators; and setting an RT timestamp to zero.

Example 25 is an apparatus for sparse superline removal, comprising: means for, in response to occupancy of a replacement tracker (RT) exceeding an RT eviction watermark, triggering an eviction process for evicting a superline from a sectored cache storing at least one superline; and means for, selecting an eviction candidate from superlines that have: 1) a sector usage below or equal to a superline low watermark and 2) an RT timestamp that is greater than a superline age watermark.

Examiner 26 is an apparatus comprising means to perform a method as claimed in any preceding claim.

Examiner 27 is a machine-readable storage including machine-readable instructions, when executed, to implement a method or realize an apparatus as claimed in any preceding claim.

What is claimed:

1. An apparatus comprising:
   a sectored cache to store at least one superline;
   a replacement tracker (RT), wherein the replacement tracker includes RT entries, and wherein each of the RT entries includes a superline valid indicator that indicates whether that RT entry is being used for a corresponding superline, sector valid indicators that each indicate whether a corresponding sector has been filled, and an RT timestamp that indicates an age of the corresponding superline; and
   a cache controller to:
      in response to occupancy of the replacement tracker exceeding an RT eviction watermark, trigger an eviction process;
      select an eviction candidate that is a superline from superlines that have: 1) a sector usage below or equal to a superline low watermark and 2) an RT timestamp that is greater than a superline age watermark; and
      in response to determining that all of the sector valid indicators are set for the superline, release an RT entry corresponding to the superline by clearing a superline valid indicator for the RT entry.

2. The apparatus of claim 1, wherein the cache controller is to:
   evict the eviction candidate by evicting a non-modified superline before evicting a modified superline.

3. The apparatus of claim 1, wherein the replacement tracker includes RT entries, and wherein each of the RT entries includes the superline valid indicator that indicates whether that RT entry is being used for the superline, a flow indicator that indicates one of a fill state and an evict state, a superline address that indicates an address of a transaction that initiated a fill, the sector valid indicators that each indicate whether a corresponding sector has been filled, and the RT timestamp that indicates an age of the superline.

4. The apparatus of claim 3, wherein the cache controller is to:
   in response to receiving fill of a sector, set a sector valid indicator in the replacement tracker to indicate that data for that sector is valid.

5. The apparatus of claim 3, wherein the cache controller is to:
   in response to an RT age tick occurring, increment the RT timestamp for each of the superlines that did not reach a maximum value for the RT timestamp, wherein the RT age tick comprises a global timer that is configured to tick once every N cycles.

6. The apparatus of claim 1, wherein the cache controller is to:
   in response to receiving an indication that a particular superline of the superlines is starting to be filled with data, assign an RT entry of the RT entries to the superline.

7. The apparatus of claim 1, wherein the cache controller is to:
   for an RT entry of the RT entries,
      set the superline valid indicator to valid;
      set a flow indicator to fill state;
      set a superline address to an address of a transaction that initiated a fill;
      identify a way number of the sectored cache for the superline;
      clear the sector valid indicators; and
      set the RT timestamp to zero.

8. A system, comprising:
a processor; and
a computer readable storage media including computer program code executed by the processor to perform operations comprising:
storing a replacement tracker (RT), wherein the replacement tracker includes RT entries, and wherein each of the RT entries includes a superline valid indicator that indicates whether that RT entry is being used for a corresponding superline, sector valid indicators that each indicate whether a corresponding sector has been filled, and an RT timestamp that indicates an age of the corresponding superfine;
in response to occupancy of a replacement tracker (RT) exceeding an RT eviction watermark, triggering an eviction process;
selecting an eviction candidate that is a superline from superlines that have: 1) a sector usage below or equal to a superline low watermark and 2) an RT timestamp that is greater than a superline age watermark; and
in response to determining that all of the sector valid indicators are set for the superline, releasing an RT entry corresponding to the superline by clearing a superline valid indicator for the RT entry.

9. The system of claim 8, wherein the operations further comprise:
evicting the eviction candidate by evicting a non-modified superline before evicting a modified superline.

10. The system of claim 8, wherein the replacement tracker includes RT entries, and wherein each of the RT entries includes the superline valid indicator that indicates whether that RT entry is being used for the superline, a flow indicator that indicates one of a fill state and an evict state, a superline address that indicates an address of a transaction that initiated a fill, the sector valid indicators that each indicate whether a corresponding sector has been filled, and the RT timestamp that indicates an age of the superline.

11. The system of claim 10, wherein the operations further comprise:
in response to receiving fill of a sector, setting a sector valid indicator in the replacement tracker to indicate that data for that sector is valid.

12. The system of claim 10, wherein the operations further comprise:
in response to an RT age tick occurring, incrementing the RT timestamp for each of the superlines that did not reach a maximum value for the RT timestamp, wherein the RT age tick comprises a global timer that is configured to tick once every N cycles.

13. The system of claim 8, wherein the operations further comprise:
in response to receiving an indication that a particular superline of the superlines is starting to be filled with data, assigning an RT entry of the RT entries to the superline.

14. The system of claim 8, wherein the operations further comprise:
for an RT entry of the RT entries,
setting the superline valid indicator to valid;
setting a flow indicator to fill state;
setting a superline address to an address of a transaction that initiated a fill;
identifying a way number of a sectored cache for the superline;
clearing the sector valid indicators; and
setting the RT timestamp to zero.

15. A computer-implemented method, comprising:
storing a replacement tracker (RT), wherein the replacement tracker includes RT entries, and wherein each of the RT entries includes a superline valid indicator that indicates whether that RT entry is being used for a corresponding superline, sector valid indicators that each indicate whether a corresponding sector has been filled, and an RT timestamp that indicates an age of the corresponding superfine;
in response to occupancy of a replacement tracker (RT) exceeding an RT eviction watermark, triggering an eviction process;
selecting an eviction candidate that is a superline from superlines that have: 1) a sector usage below or equal to a superline low watermark and 2) an RT timestamp that is greater than a superline age watermark; and
in response to determining that all of the sector valid indicators are set for the superline, releasing an RT entry corresponding to the superline by clearing a superline valid indicator for the RT entry.

16. The method of claim 15, further comprising:
evicting the eviction candidate by evicting a non-modified superline before evicting a modified superline.

17. The method of claim 15, wherein the replacement tracker includes RT entries, and wherein each of the RT entries includes the superline valid indicator that indicates whether that RT entry is being used for the superline, a flow indicator that indicates one of a fill state and an evict state, a superline address that indicates an address of a transaction that initiated a fill, the sector valid indicators that each indicate whether a corresponding sector has been filled, and the RT timestamp that indicates an age of the superline.

18. The method of claim 17, further comprising:
in response to receiving fill of a sector, setting a sector valid indicator in the replacement tracker to indicate that data for that sector is valid.

19. The method of claim 17, further comprising:
in response to an RT age tick occurring, incrementing the RT timestamp for each of the superlines that did not reach a maximum value for the RT timestamp, wherein the RT age tick comprises a global timer that is configured to tick once every N cycles.

20. The method of claim 15, further comprising:
in response to receiving an indication that a particular superline of the superlines is starting to be filled with data, assigning an RT entry of the RT entries to the superline.

21. The method of claim 15, further comprising:
for an RT entry of the RT entries,
setting the superline valid indicator to valid;
setting a flow indicator to fill state;
setting a superline address to an address of a transaction that initiated a fill;
identifying a way number of a sectored cache for the superline;
clearing the sector valid indicators; and
setting the RT timestamp to zero.

\* \* \* \* \*